(12) United States Patent
Hammarberg et al.

(10) Patent No.: US 12,467,539 B2
(45) Date of Patent: Nov. 11, 2025

(54) SEALING ARRANGEMENT

(71) Applicant: ANDRITZ OY, Helsinki (FI)

(72) Inventors: Tommi Hammarberg, Helsinki (FI); Sonja Hirvasniemi, Kotka (FI)

(73) Assignee: ANDRITZ OY, Helsinki (FI)

( * ) Notice: Subject to any disclaimer, the term of this patent is extended or adjusted under 35 U.S.C. 154(b) by 22 days.

(21) Appl. No.: 18/576,087

(22) PCT Filed: Jun. 17, 2022

(86) PCT No.: PCT/FI2022/050424
§ 371 (c)(1),
(2) Date: Jan. 2, 2024

(87) PCT Pub. No.: WO2023/275437
PCT Pub. Date: Jan. 5, 2023

(65) Prior Publication Data
US 2024/0318725 A1    Sep. 26, 2024

(30) Foreign Application Priority Data

Jul. 2, 2021    (FI) ...................................... 20215776

(51) Int. Cl.
| F16J 15/46   | (2006.01) |
| F16J 15/3268 | (2016.01) |
| F16J 15/3284 | (2016.01) |
| F16J 15/3296 | (2016.01) |
| G01M 3/28    | (2006.01) |

(52) U.S. Cl.
CPC .......... *F16J 15/46* (2013.01); *F16J 15/3268* (2013.01); *F16J 15/3284* (2013.01); *F16J 15/3296* (2013.01); *G01M 3/2869* (2013.01)

(58) Field of Classification Search
CPC ...... F16J 15/46; F16J 15/3268; F16J 15/3284; F16J 15/3296; F16J 15/01
See application file for complete search history.

(56) References Cited

U.S. PATENT DOCUMENTS

| 3,023,995    A  |   | 3/1962 | Hopkins |             |
|----------------|---|--------|---------|-------------|
| 3,608,731    A | * | 9/1971 | Seggebruch | .......... B01D 29/74 |
|                |   |        |         | 277/918 |
| 5,246,235    A | * | 9/1993 | Heinzen | ................... F16J 15/16 |
|                |   |        |         | 277/321 |
| 2003/0152109 A1 | * | 8/2003 | Quijano | ................ H04J 3/0691 |
|                |   |        |         | 370/503 |

(Continued)

FOREIGN PATENT DOCUMENTS

| CN | 106949241 A | 7/2017 |
| CN | 212479927 U | 2/2021 |

(Continued)

*Primary Examiner* — Vishal A Patel
(74) *Attorney, Agent, or Firm* — Nixon & Vanderhye P.C.

(57) ABSTRACT

A sealing arrangement (100) for a shaft, including at least a first seal element (10a) arranged around the shaft (30); at least a second seal element (10b) arranged around the shaft (30); wherein the first (10a) and second (10b) seal element include adjustable seal elements, wherein the first (10a) and second (10b) seal element include, respectively, an outer shell (14a,14b) of elastic material and a hollow core (12a, 12b), wherein the hollow core (12a,12b) of the first (10a) and/or the second (10b) seal element is pressurized with a fluid for an adjustable sealing effect.

11 Claims, 5 Drawing Sheets

(56) References Cited

U.S. PATENT DOCUMENTS

2017/0058624 A1* 3/2017 Jaffrey ................. E21B 33/062
2017/0138477 A1   5/2017 Cutler et al.

FOREIGN PATENT DOCUMENTS

| EP | 1231419 A2 * | 8/2002 | ........... F16J 15/3412 |
| GB | 301066 A | 10/1929 | |
| RU | 2702438 C1 | 10/2019 | |
| WO | 2021112753 A1 | 6/2021 | |

* cited by examiner

SEALING ARRANGEMENT

RELATED APPLICATION

This application is the U.S. national phase of International Application No. PCT/FI2022/050424 filed Jun. 17, 2022, which designated the U.S. and claims priority to Finnish FI 20215776 filed Jul. 2, 2021, the entire contents of each of which are hereby incorporated by reference.

TECHNICAL FIELD

The present invention relates to a sealing arrangement. In particular, but not exclusively, the present invention relates to a sealing arrangement for sealing an axle or a shaft. In particular, but not exclusively, the present invention relates to a sealing arrangement for sealing an axle or a shaft of a white liquor or lime filter.

BACKGROUND

An environment with alkaline liquids, or liquid suspensions containing solid residue, such as particles, places high demands on any sealing arrangements both from technical and safety reasons. Traditionally braided seal ropes are used.

In such an environment, the sealing arrangement must provide affective sealing as any alkaline liquid, such as white liquor, penetrates traditional sealing arrangements easily compared with for example water. Furthermore, a suspension containing solid residue might harden a seal, and start wearing down both the seal and the sealing surface.

Furthermore, sealing an axle or a shaft, for example of a rotary filter at a white liquor plant, which typically rotates, moves back and forth in an axial direction and is exposed to varying pressures and temperatures depending on the process conditions, requires a seal that is able to adapt to the conditions and follow the sealing surface for effective sealing in all situations. Previously, braided seals with an elastic core have been used in addition to seal rope.

The inventors have found that the existing solutions might not provide an efficient sealing in every situation. Accordingly, a sealing arrangement having adjustable seal elements is provided for efficient sealing, using pressurized seal element, the pressure of which is monitored and adjusted It is the object of the present invention to improve the existing solutions by providing an efficient sealing arrangement using adjustable seal elements.

SUMMARY

Various aspects of examples of the invention are set out in the claims.

According to a first example aspect of the present invention, there is provided a sealing arrangement for a shaft, comprising
   at least a first seal element arranged around the shaft;
   at least a second seal element arranged around the shaft; wherein
   the first and second seal element comprise adjustable seal elements, wherein;
   the first and second seal element comprise, respectively, an outer shell of elastic material and a hollow core, wherein
   the hollow core of the first and/or the second seal element is pressurized with a fluid for an adjustable sealing effect.

The outer shell may comprise an outer layer of braided material.

At least the first and/or second seal element may comprise an electric circuit element configured to break due to the outer shell being worn down or torn.

The sealing arrangement may further comprise valves connected, respectively, to an inlet port for supplying the fluid for pressurizing the first and the second seal element.

The fluid may comprise a gas, such as air.

The sealing arrangement may further comprise a fluid space between at least the first and the second seal element.

The pressure in the fluid space may be adjustable.

The shaft may comprise a shaft of a rotary filter unit.

According to second example aspect of the invention there is provided a method for controlling a sealing arrangement for a shaft according to the first example aspect of the invention, comprising
   setting a first pressure inside a first seal element arranged around a shaft;
   setting a second pressure inside a second seal element arranged around the shaft;
   monitoring the pressure inside the first and/or the second seal element; and
   adjusting the pressure inside the first and/or the second seal element for an adjustable sealing effect.

The method may further comprise monitoring the wear of the first and/or the second seal element using an electric circuit element.

The method according may further comprise scheduling the first or the second seal element for replacement based on monitoring of the pressure and/or monitoring the wear.

According to a third example aspect of the invention, there is provided a rotary filter unit comprising the sealing arrangement of the first example aspect of the invention.

According to a fourth example aspect of the invention, there is provided a control system for controlling a sealing arrangement of the first example aspect of the invention, comprising a control device connected to at least one measurement and actuator module for carrying out the method of the second example aspect of the invention.

According to a fifth example aspect of the present invention, there is provided a computer program comprising computer-executable program code that, when executed by a processor, causes carrying out the method according to the second example aspect.

According to a sixth example aspect of the present invention, there is provided a non-transitory memory medium comprising the computer program of the fifth example aspect.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
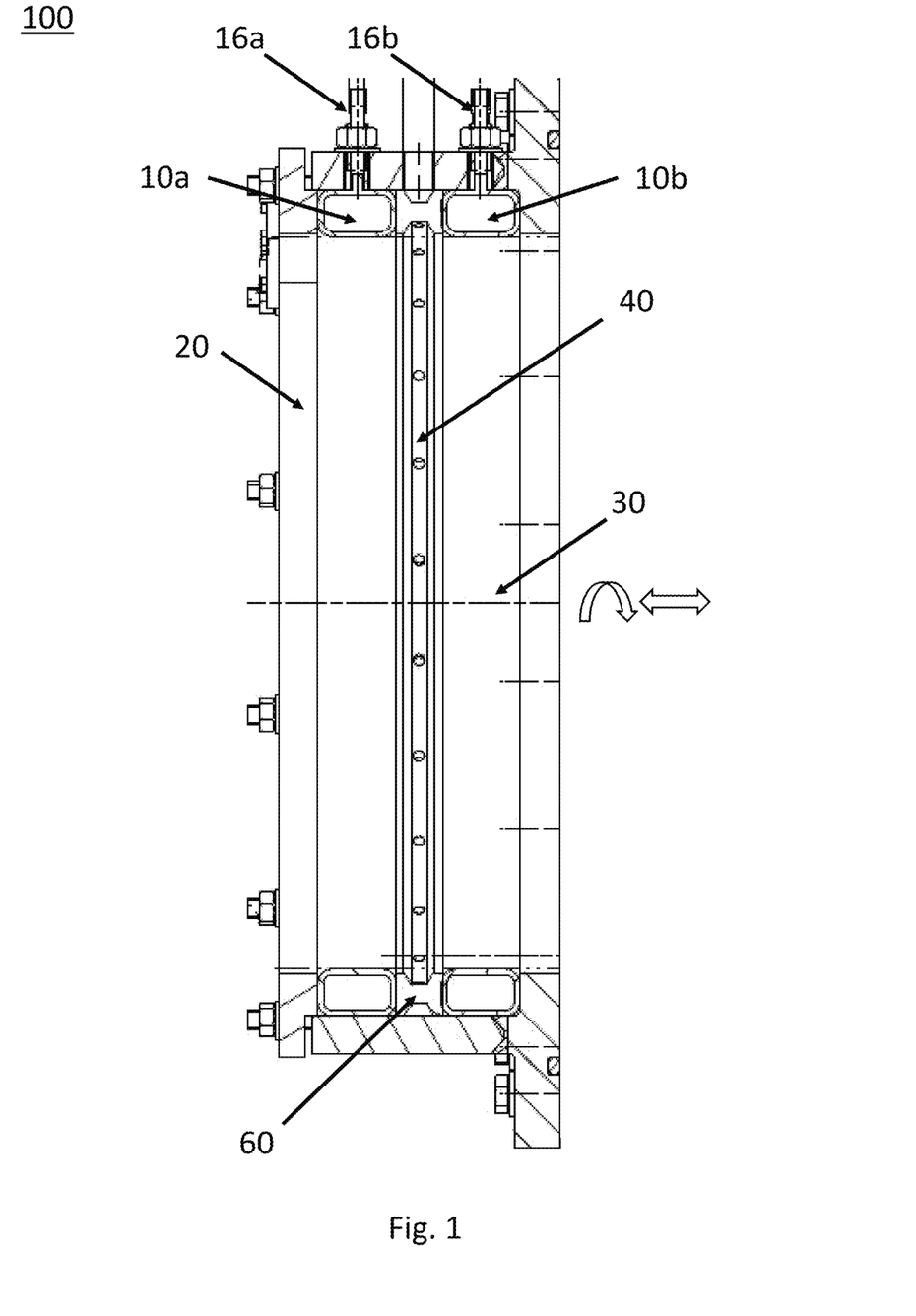
FIG. 1 shows a schematic cross-sectional view of a sealing arrangement according to an example embodiment of the present invention.

FIG. 1 shows a schematic cross-sectional view of a sealing arrangement 100 according to an example embodiment of the present invention. The sealing arrangement 100 is depicted at an end and around a shaft 30 of a disc filter unit. In an embodiment, the filter unit is a rotary filter unit of a white liquor plant, such as a white liquor filter or a lime mud filter. The sealing arrangement 100 comprises at least a first, or outer, seal element 10a and at least a second, or inner, seal element 10b. The first 10a and a second 10b seal element are arranged concentrically around the shaft 30. In an embodiment, the arrangement comprises at least one further seal element (not shown). The arrangement 100 comprises a fluid space 60 between the first 10a and the second 10b seal element. The fluid space 60 is filled with a fluid, in an embodiment water, for increasing the sealing effect and for flushing the seal surfaces while preventing solid particles from wearing down the seal elements. In an embodiment, the pressure of the fluid in the fluid space 60 is controlled, or adjusted, for example by adjusting the flow of the fluid into the fluid space 60, to a suitable pressure. In an embodiment, the fluid pressure in the fluid space 60 is larger than the pressure inside the rotary filter.

The shaft 30 rotates around its axis, as shown with an arrow in FIG. 1. The direction of rotation is not decisive. Furthermore, the shaft 30 reciprocates in an axial direction as shown with an arrow in FIG. 1. The combined rotation and reciprocation places high demands on the sealing arrangement 100. Using traditional sealing, the seal elements would have to exert a large pressing force causing large friction. Furthermore, should the shaft 30 not be perfectly round, as it is expensive and difficult to manufacture perfectly round shafts especially in case of hollow shafts as in an embodiment used in the rotary filter unit, the sealing could be compromised. It is further to be noted that the interior of the filter unit is pressurized and contains alkaline material making the operating environment demanding.

Accordingly, the first 10a and the second 10b seal element are adjustable, i.e. the sealing effect is controlled by pressurizing the seal elements 10a, 10b with pressurized fluid, in an embodiment gas, such as air, through pressure valves 18a, 18b. The internal pressure of the first 10a and the second 10b seal element is individually adjustable, i.e. the pressurization need not be at the same level for both. In an embodiment, the internal pressure of the first 10a and/or the second 10b pressure element is set to correspond to ambient pressure.

The adjustable pressure provides for an adjustable sealing effect, i.e. the pressure of the first 10a and second 10b seal element is adjusted in such a way as to provide a sealing effect in each operating situation. The pressure in the fluid space 60 is in an embodiment adjusted relative to the pressure of the first 10a and second 10b seal element. in an embodiment, the pressure in the fluid space 60 is lower than the pressure of the first 10a and second 10b seal element. In an embodiment, the fluid to the fluid space 60 is supplied via a hydraulic accumulator in order to ascertain the sealing effect of the fluid in case of disruption in fluid supply. FIG. 1 further shows the placement of the first 10a and second 10b seal element. The first seal element 10a is in an embodiment positioned between the outer shell 20 and gland 40 of the filter unit. The second seal element 10b is in an embodiment positioned between the gland 40 and the interior of the filter unit. Although the first 10a and second 10b seal element have been depicted as having a same size, i.e. diameter and inner cross-sectional diameter, the first 10a and the second 10b seal element in a further embodiment have different sizes. In an example embodiment, the diameter of the first 10a and second 10b seal element, i.e. the diameter of the shaft, is 1300 mm.

Figure 2:
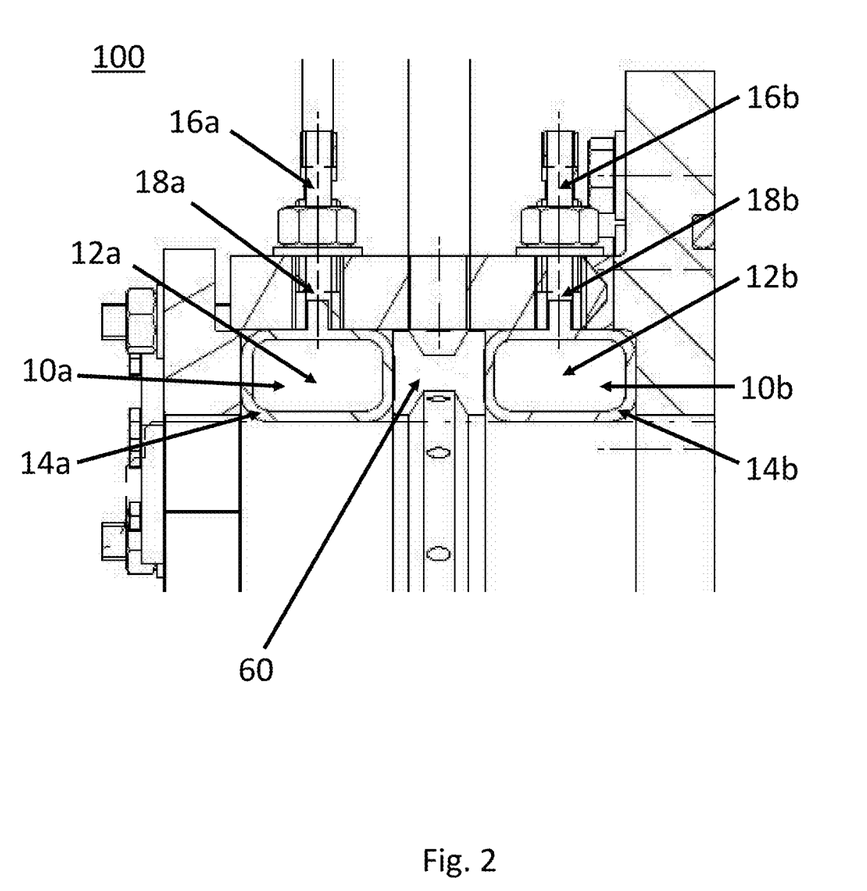
FIG. 2 shows a further schematic cross-sectional view of a sealing arrangement according to an example embodiment of the present invention.

FIG. 2 shows a further, enlarged with respect to FIG. 1, schematic cross-sectional view of a sealing arrangement according to an example embodiment of the present invention. FIG. 2 shows the first 10a and second 10b seal elements. In an example embodiment, the seal elements comprise ExSeal-seal elements. Each seal element 10,10b comprises an outer shell 14a, 14b and a hollow core 12a, 12b. In an embodiment, the outer shell 14a, 14b comprises elastic material. In an embodiment, the outer shell 14a, 14b comprises a layer of elastic material, such as rubber, and an outer layer resistant to wear and tear, for example an outer layer of braided material.

The hollow core 12a, 12b of the first 10a and the second 10b seal element is pressurized with a fluid, in an example embodiment gas, such as air. The fluid is directed inside the first 10a and second 10b seal element, respectively, through a nipple, or valve, 18a, 18b. The valves 18a, 18b are connected, respectively to an inlet port 16a, 16b for supplying the fluid for pressurizing the seal elements 10a, 10b through the outer shell of the filter unit.

In an embodiment, as depicted in FIGS. 1 and 2, the valves 18a, 18b and the inlet ports 16a, 16b are positioned in a direction perpendicular to the axis of the shaft around which the seal elements are placed. In a further embodiment, depicted in FIG. 3, the valves 18a, 18b and the inlet ports 16a, 16b are positioned in a direction parallel to the axis of the shaft around which the seal elements are placed, in a still further embodiment, the positioning of the valves 18a, 18b and the inlet ports 16a, 16b is different for the first 10a and the second 10b seal element.

Figure 3:
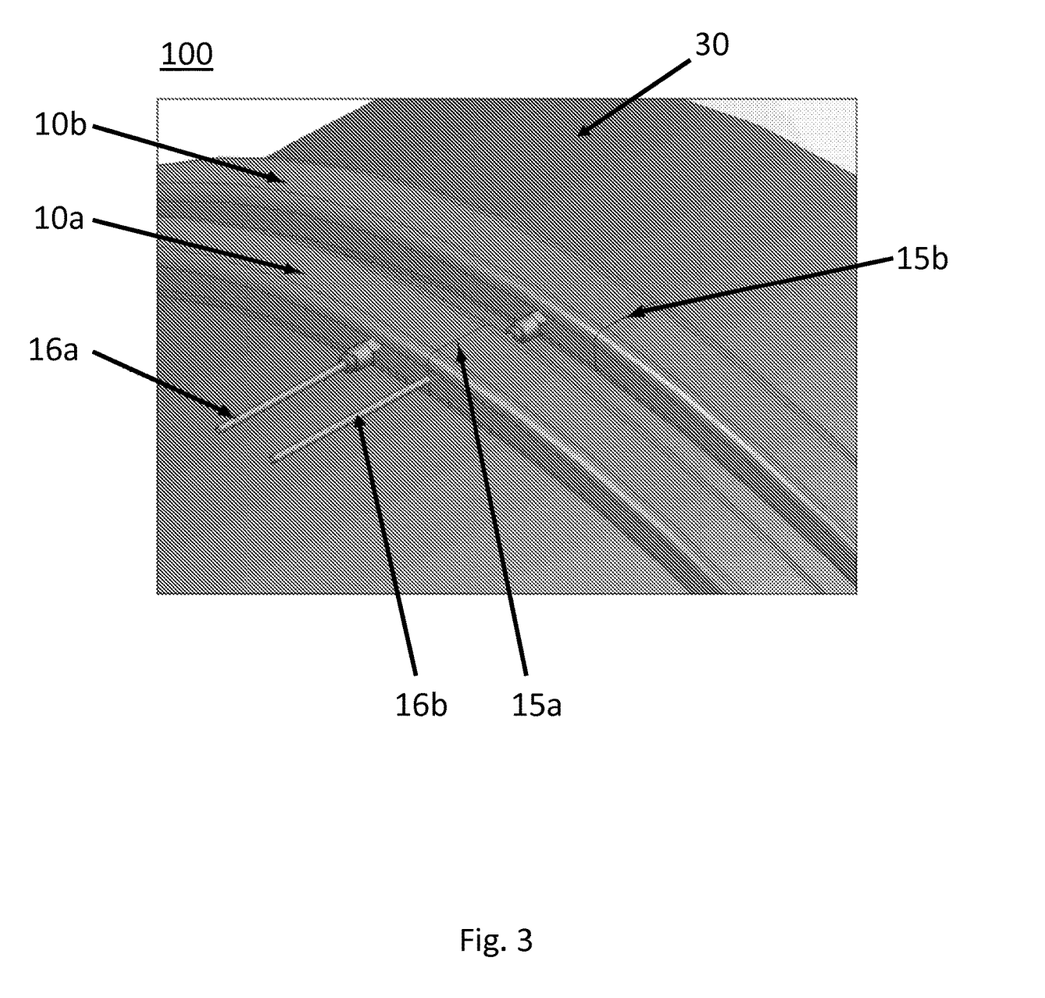
FIG. 3 shows a schematic three-dimensional view of a sealing arrangement according to an example embodiment of the present invention.

FIG. 3 shows a schematic three-dimensional view of a sealing arrangement according to an example embodiment of the present invention. FIG. 3 shoes the first seal element 10a and the second seal element 10b around a shaft 30. FIG. 3 shows also the seams 15a, 15b of the first 10a and second 10b seal element. The seal elements 10a and 10b are in an embodiment not unbroken rings, but formed into a ring from a tube closed at both ends thereof and attached at those ends at the seam 15a, 15b. FIG. 3 further shows the inlet ports 16a, 16b of the first 10a and second 10b seal element respectively. In the embodiment of FIG. 3, the tubing of the inlet port 16b of the second seal element 10b has been arranged in the seam 15a of the first seal element 10a.

Figure 4:
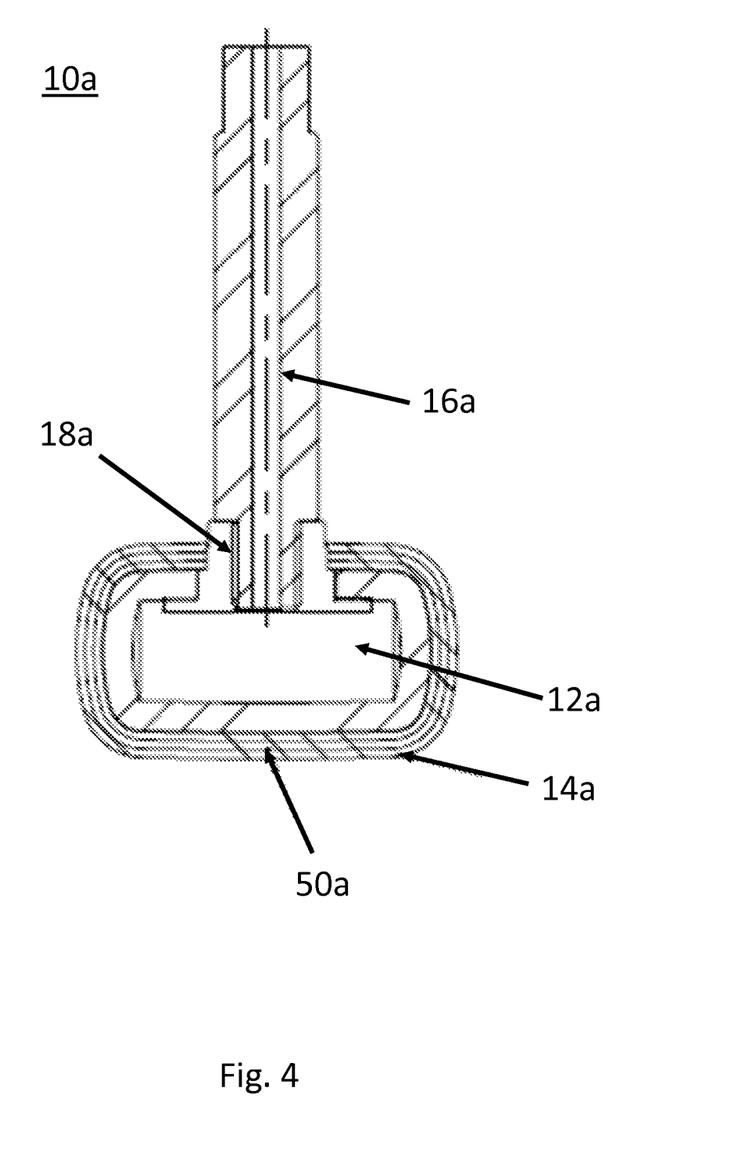
FIG. 4 shows a schematic cross-sectional view of a seal element according to an example embodiment of the present invention.

FIG. 4 shows a schematic cross-sectional view of a seal element according to an example embodiment of the present invention. FIG. 4 shows as an example the first seal element 10a and a skilled person understands that the structure and functionality of the second seal element 10b and any further seal element is, in an embodiment, similar. The first seal element comprises, as previously explained with reference to FIGS. 1-3, the hollow core 12a, the elastic outer shell 14a, the valve 18a and is attached to the inlet port 16a for providing the pressurizing fluid. In the embodiment, of FIG. 4, the seal element 10a further comprises at least one electric circuit element 50a configured for conducting electric current until broken. The electric circuit element 50a comprises in an embodiment for example copper wire. The electric circuit element 50a is positioned in such a way in the outer shell 14a of the seal element 10a that as the seal element 10a is subjected to wear, the electric circuit element 50a will at some point break due to the outer shell being worn down or torn in use. In the event that the electric circuit element 50a breaks, it will no longer conduct electric current which can be detected and accordingly excessive wear of the seal element 10a is detected. In a further embodiment, the seal element 10a further comprises a temperature sensor embedded therein.

Figure 5:
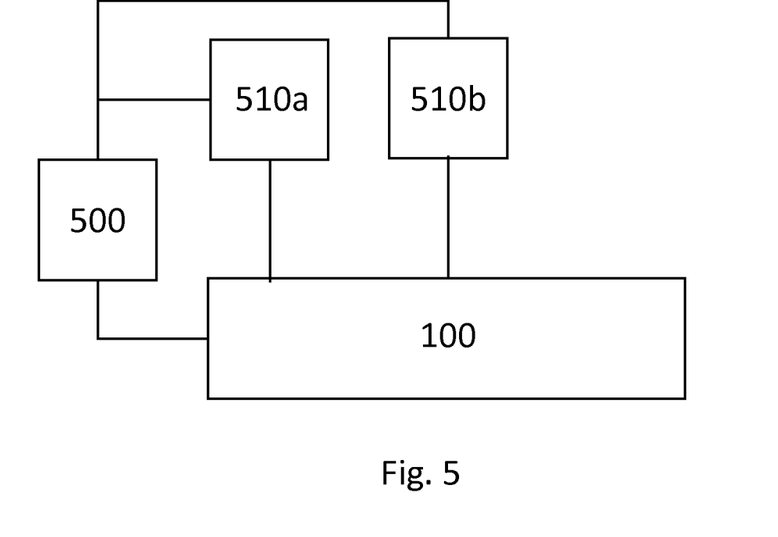
FIG. 5 shows a schematic block view of a sealing arrangement control system according to an example embodiment of the present invention.

FIG. 5 shows a schematic block view of a sealing arrangement control system according to an example embodiment of the present invention. FIG. 5 shows the sealing arrangement 100 and the control means connected thereto. The controls system comprises a control device 500. In an embodiment, the control device 500 is a standalone control device configured to control the sealing arrangement 100, for example a local control device or a cloud-based control system. In a further embodiment, the control device 500 is integrated into a mill-wide control system.

The control device 500 is connected to measurement and actuator modules 510a,510b. In an embodiment, there is provided a measurement and actuator module for each seal element 10a, 10b separately. In a further embodiment, a single measurement and actuator module is provided jointly for all seal elements 10,10b. The measurement and actuator modules 510a,510b are configured to measure the pressure inside the first 10a and second 10b seal element of the sealing arrangement 100. Furthermore, the measurement and actuator modules 510a,510b are configured to operate the means for providing and adjusting the pressure inside the first 10a and second 10b seal element, such as valves. In a further embodiment, the measurement and actuator modules 510a,510b are configured to monitor the electric current conducted by the electric circuit element 50a in order to detect wear that has broken the electric circuit. In a still further embodiment, the measurement and actuator modules 510a,510b are configured to monitor the temperature of the seal elements 10a, 10b.

Figure 6:
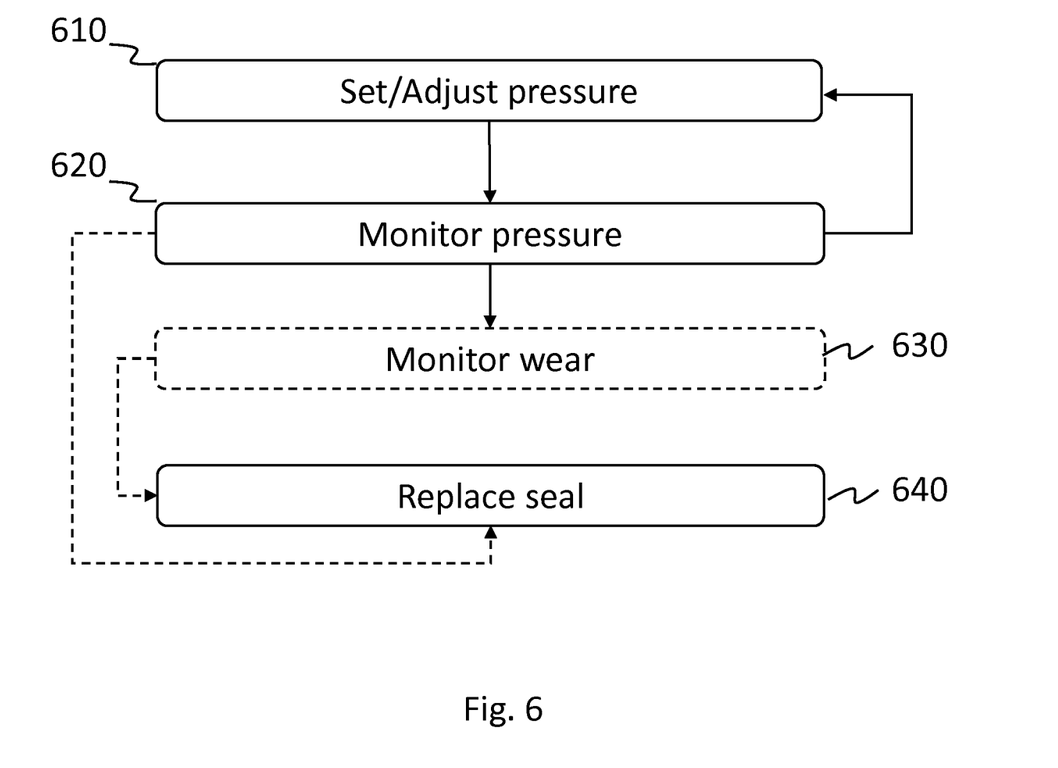
FIG. 6 shows a flow chart a sealing arrangement control method according to an example embodiment of the present invention.

FIG. 6 shows a flow chart a sealing arrangement control method according to an example embodiment of the present invention. In an embodiment, the method according to an example embodiment of the invention is caused to be carried out by a processor, for example a processor of a control system or control device 500. At step 610 the pressure inside the at least the first 10a and/or the second 10b seal element is set as well as the pressure in the fluid space 60. In an embodiment, the pressures are set at predetermined pressure values. In a further embodiment, the pressures are set depending on the operating pressure of the filer unit in the operating situation at hand. In an embodiment, the pressure is set to a different value for the first 10a and the second 10b seal element. In an embodiment, the pressure inside the at least the first 10a and the second 10b seal element is substantially in the range of 0.5 to 4 bar, or 1.6 to 3 bar, as examples.

At step 620, the pressure inside the first 10a and/or second 10b seal element is monitored during operation. In an embodiment, the pressure is monitored in realtime, or intermittently. In an embodiment, the pressure is monitored with a pressure sensor. In a further embodiment, the pressure is monitored by monitoring the amount of fluid, e.g. air, needed to maintain the pressure. Should the pressure fall, or the amount of fluid needed to uphold it, the seal element 10a, 10b in question might be worn too much, in which case it will be scheduled for replacement at step 640. Pressure inside the first 10a and/or second 10b seal element is in an embodiment adjusted at step 610 also during operation, for example based on the operating situation or based on the measurement at step 620.

In an embodiment, the wear of the first 10a and/or the second 10b seal element is monitored using the electric circuit element 50a. In an embodiment, the wear monitor comprises an alarm that is triggered when the electric circuit element 50a does not conduct, i.e. the circuit is broken due to wear of the seal element in question. In such a case, the seal element is scheduled for replacement at step 640.

Without in any way limiting the scope, interpretation, or application of the claims appearing below, a technical effect of one or more of the example embodiments disclosed herein is providing effective sealing for a rotating and reciprocating shaft. Another technical effect of one or more of the example embodiments disclosed herein is the provision of effective sealing in an alkaline environment. Another technical effect of one or more of the example embodiments disclosed herein is enabling adjustment and monitoring of sealing efficiency. A still further technical effect of one or more of the example embodiments disclosed herein is a safer and more maintenance free sealing. Another technical effect of one or more of the example embodiments disclosed herein is an increased lifetime of the sealing.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. A sealing arrangement for a shaft comprising:
an outer structure extending around the shaft, wherein the outer structure includes a circumferential inner surface extending circumferentially around the shaft and facing a circumferential outer surface of the shaft;
a first annular seal element between the inner surface of the outer structure and the outer surface of the shaft, wherein the first annular seal is arranged around and in sliding contact with the shaft, wherein the first seal element includes a first annular outer shell of elastic material and a first annular hollow core within the first annular outer shell, and the first annular outer shell includes a first sidewall extending outward radially with respect to an axis of the shaft aligned;

a second annular seal element between the inner surface of the outer structure and the outer surface of the shaft, wherein the second annular seal arranged around and in sliding contact with the shaft, wherein the second annular seal element includes a second annular outer shell of elastic material and a second annular hollow core within the second annular outer shell, and the second annular outer shell includes a second sidewall facing the first sidewall along a direction parallel to the axis of the shaft and the second sidewall extending outward radially with respect to the axis of the shaft;

an annular fluid space arranged around the shaft between the first seal element and the second seal element, wherein opposite radially extending ends of the annular fluid space spaced apart along the direction parallel to the axis of the shaft are defined by the first and second sidewalls, a radially outer circumference of the annular fluid space is defined by the inner surface of the outer structure, and a radially inner circumference of the annular fluid space is defined by the outer surface of the shaft and/or a gland mounted on the shaft, wherein the radially outer circumference of the annular fluid space extends radially outward at least as far as the radial outer surface of the first annular seal element or the second annular seal element, wherein the hollow core of the first seal element and/or the second seal element is pressurized with a fluid to provide an adjustable sealing effect, wherein the first seal element and/or the second seal element comprises an electric circuit element configured to break due to the outer shell being worn or torn, wherein the electric circuit is on or in the outer shell adjacent a surface of the outer shell in sliding contact with the outer surface of the shaft, and wherein the electric circuit forms a conductive path extending a length of the outer shell, in the direction parallel to the axis of the shaft, wherein the length extends entirely across the outer surface of the outer shell in sliding contact with the shaft.

2. The sealing arrangement according to claim 1, wherein the outer shell of the first seal element and/or the second seal element comprises an outer layer of braided material.

3. The sealing arrangement according to claim 1, further comprising valves connected, respectively, to an inlet port for supplying the fluid for pressurizing the first seal element and the second seal element.

4. The sealing arrangement according to claim 1, wherein the fluid comprises a gas.

5. The sealing arrangement according to claim 1, wherein a pressure in the annular fluid space is lower than pressures in the first hollow core and in the second hollow core.

6. The sealing arrangement according to claim 5, wherein the pressure in the fluid space is adjustable.

7. The sealing arrangement according to claim 1, wherein the shaft comprises a shaft of a rotary filter unit.

8. A rotary filter unit comprising the sealing arrangement of claim 1.

9. An assembly comprising:

an outer structure extending around the shaft, wherein the outer structure includes a circumferential inner surface extending circumferentially around the shaft and facing a circumferential outer surface of the shaft;

a shaft configured to rotate about a rotational axis and having a first end region;

a first annular seal element between the inner surface of the outer structure and the outer surface of the shaft, wherein the first annular seal encircles and is in sliding contact with the first end region of the shaft, the first annular seal element including a first annular outer elastic material shell, a first annular hollow core within the first annular outer elastic material shell, and a first pressure inlet port configured to pass a pressurized fluid into the first annular hollow core, wherein the first annular outer shell includes a first sidewall extending radially relative to an axis of the shaft;

a second annular seal element between the inner surface of the outer structure and the outer surface of the shaft, wherein the second annular seal encircles and is in sliding contact with the first end region of the shaft, the second annular seal element including a second annular outer elastic material shell, a second annular hollow core within the second annular outer elastic material shell and a second pressure inlet port configured to pass a pressurized fluid into the second annular hollow core, wherein the second annular outer shell includes a second sidewall extending radially relative to the axis of the shaft and the second annular seal element is separated from the first annular seal element along a direction parallel to the axis of the shaft; and an annular fluid space arranged around the shaft between the first seal element and the second seal element, wherein opposite radially extending ends of the annular fluid space spaced apart along the direction parallel to the axis of the shaft are defined by the first and second sidewalls and a radially outer circumference of the annular fluid space is defined by the inner surface of the outer structure, and a radially inner circumference of the annular fluid space is defined by the outer surface of the shaft or a gland mounted on the shaft, wherein the radially outer circumference of the annular fluid space extends radially outward at least as far as the radial outer surface of the first annular seal element or the second annular seal element;

wherein a pressure in the first annular hollow core adjustable to adjust a seal between the first annular seal element and the first end region of the shaft, wherein a pressure in the second annular hollow core is adjustable to adjust a seal between the second annular seal element and the first end region of the shaft, wherein the first seal element includes an electric circuit element configured to break due to the outer shell of the first seal element being worn or torn, wherein the electric circuit element is on or in the outer shell adjacent a surface of the outer shell in sliding contact with the outer surface of the shaft, wherein the electric circuit element forms a conductive path extending a length of the outer shell in the direction parallel to the rotational axis of the shaft, and wherein the length of the outer shell extends entirely across the surface of the outer shell in sliding contact with the outer surface of the shaft.

10. The assembly of claim 9, wherein the annular fluid space is pressurized to a pressure greater than pressures in the first hollow core and in the second hollow core.

11. The assembly of claim 10, wherein the gland is mounted to and encircles the first end region of the shaft, wherein the gland is between the first annular seal element and the second annular seal element, and the gland is aligned with the annular fluid space in a plane perpendicular to the axial length of the shaft.

* * * * *